United States Patent
Kobayashi et al.

[15] 3,683,248
[45] Aug. 8, 1972

[54] DIRECTLY DRIVEN TURNTABLE APPARATUS FOR PHONOGRAPH RECORDS

[72] Inventors: Kazutsugu Kobayashi, Takatsuki; Yoshiaki Igarashi, Kadoma; Hisayuki Matsumoto, Neyagawa, all of Japan

[73] Assignee: Matsushita Electric Industrial Co., Ltd., Osaka, Japan

[22] Filed: March 24, 1971

[21] Appl. No.: 127,494

[30] Foreign Application Priority Data

July 17, 1968 Japan.....................43/51284
Oct. 9, 1968 Japan.....................43/74081

Related U.S. Application Data

[63] Continuation-in-part of Ser. No. 840,727, July 10, 1969, abandoned.

[52] U.S. Cl...............318/138, 274/39 A, 310/68 E, 310/156, 310/179, 310/267, 318/254
[51] Int. Cl............................................H02k 29/00
[58] Field of Search......310/179, 215, 216, 105, 254, 310/258, 67, 68 B, 68 E, 156, 267; 318/127, 138, 254; 274/41, 39 A, 1 E, 1 F

[56] References Cited

UNITED STATES PATENTS

| | | | |
|---|---|---|---|
| 3,264,539 | 8/1966 | Sander | 318/138 |
| 1,304,233 | 5/1919 | Wood | 274/1 E |
| 3,329,845 | 7/1967 | Lear | 310/156 X |
| 2,976,439 | 3/1961 | Kiekhaefer | 310/156 X |
| 3,413,007 | 11/1968 | Kelly et al. | 274/39 A |
| 3,508,091 | 4/1970 | Kavanaugh | 310/156 X |
| 3,461,367 | 8/1969 | Takeyasu et al. | 318/254 |
| 2,490,789 | 12/1949 | Ellis | 310/105 |
| 3,501,664 | 3/1970 | Veillette | 318/254 X |

Primary Examiner—J. V. Truhe
Assistant Examiner—B. A. Reynolds
Attorney—Wenderoth, Lind & Ponack

[57] ABSTRACT

A turntable apparatus driven directly by an electronically commutated motor having a speed of 33 ⅓ rpm or 45 rpm which decreases the rumble and the wow and flutter to a minimum and assures these characteristics for a long time, the changing and adjusting of the turntable speed are carried out electronically without any mechanical mechanism, and the turntable is self-starting and can be built in a short time.

5 Claims, 4 Drawing Figures

INVENTORS
KAZUTSUGU KOBAYASHI
YOSHIAKI IGARASHI
HISAYUKI MATSUMOTO

BY *Wenderoth, Lind & Ponack*
ATTORNEYS

DIRECTLY DRIVEN TURNTABLE APPARATUS FOR PHONOGRAPH RECORDS

This is a continuation-in-part application of Ser. No. 840,727 filed July 10, 1969, now abandoned.

This invention relates to a turntable apparatus for a phonograph record player. More particularly, the invention relates to a turntable apparatus driven directly by an electronically commutated motor powered by a direct current power source.

In almost all of the phonograph turntables presently on sale, a conventional A.C. motor which rotates at a high speed usually from several hundred rpm to several thousand rpm is used, and the turntable is driven by the A.C. motor through an idler or a belt which usually comprises rubber material and which reduces the speed to 33 ⅓ rpm or 45 rpm.

However, the use of rubber materials as idlers or belts and the use of the conventional A.C. motor produce the following defects.

1. Rubber idlers and belts are difficult to form and machine with high precision, and have a tendency to deteriorate, causing "wow" in the phonograph turntable.

2. The high speed motor has a considerable amount of mechanical vibration caused by dynamic-unbalance in the motor. Such vibration is transmitted to the turntable. The motor is usually insulated by springs to reduce the vibration, but this is insufficient.

3. Hum is caused at A.C. line frequency owing to leakage flux of A.C. motor.

4. The speed of the A.C. motor depends on line frequency. However, because line frequencies of both 50 c/s and 60 c/s are used in different regions of the world, it is necessary to change the reduction ratio in the driving mechanism according to the A.C. line frequency to get a proper motor speed for sound reproduction. This is inconvenient for both manufacturers and consumers.

5. The speed of the A.C. motor is not usually variable. Therefore, any change in the speed of the turntable must be done mechanically, causing the record player to be complex.

6. The starting torque of the A.C. motor is small for its volume. Even if the torque used is of small value, the input power and unfavorable vibration are not significantly decreased, and the heat generated in the A.C. motor is harmful to the belt or idler.

On the other hand, there is a known phonograph turntable using a D.C. motor. However, because a conventional D.C. motor has brushes and commutators, the operational life thereof is short and further, it causes a noise by sliding contacts and an electrical noise by contact commutation. For these reasons, a D.C. motor is not conventionally used for a high quality phonograph turntable.

In view of these facts, it is an object of this invention to provide a turntable apparatus driven directly by an electronically commutated motor.

It is a further object of this invention to provide a turntable apparatus having smooth rotation and very small vibration.

It is still a further object of this invention to provide a turntable apparatus which is self-starting and operated by a D.C. power source.

It is still a further object of this invention to provide a turntable apparatus in which the initial characteristics can be maintained and assured for a long time.

It is a still further object of this invention to provide a turntable apparatus in which the rotational speed can be controlled electrically.

Other objects and advantages of this invention will become apparent from a reading of the following specification in connection with the accompanying drawings. In the several figures, similar reference numerals identify similar elements, and in which.

Figure 1:
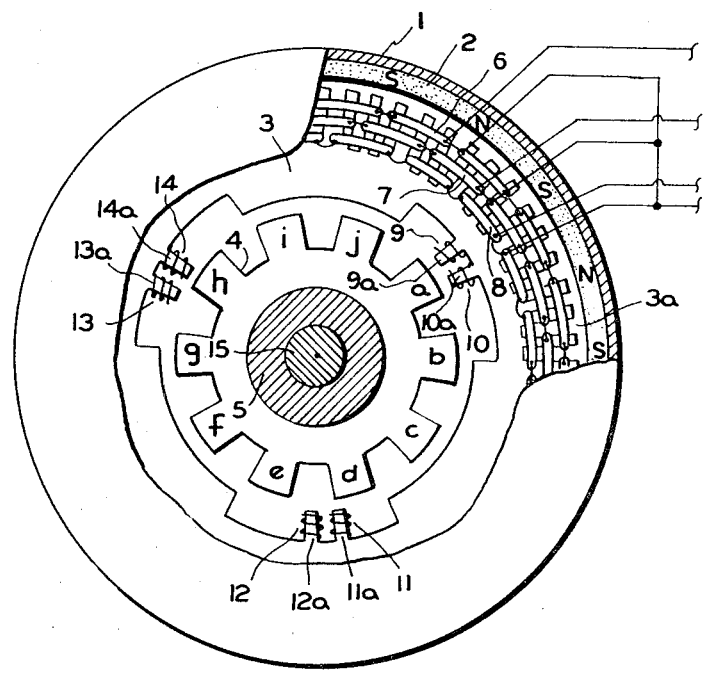
FIG. 1 is a plan view of an embodiment of the invention, certain parts being broken away and other parts being shown in section.
Figure 2:
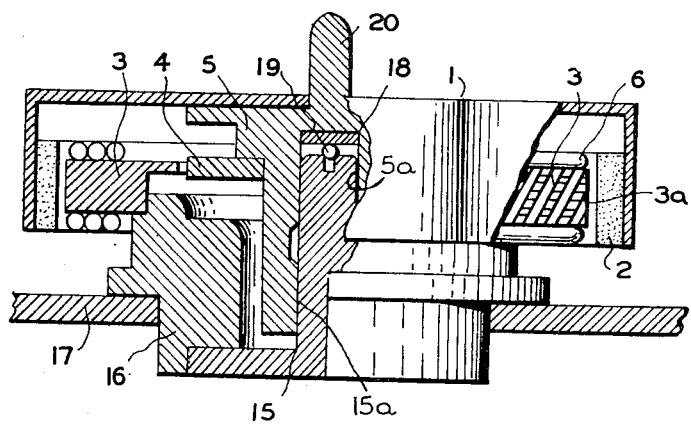
FIG. 2 is a side view of an embodiment shown in FIG. 1, certain parts being broken away and other parts being shown in section.

Referring to FIGS. 1 and 2, a rotor yoke 1 is coupled to a rotor boss 5 which is an embodiment of a rotor axis means having a radial bearing portion 5a, thrust bearing portion 18, and a spindle portion 20 for a phonograph record. A steel plate is employed for the thrust bearing portion 18 in this case. Said rotor boss 5 rotates around a shaft 15 which is an embodiment of a stator axis means comprising a radial bearing portion 15a and thrust bearing portion 19. As the thrust bearing portion 19, a steel ball is employed in this case. Said radial bearing portion 5a of the rotor boss 5 and said radial bearing portion 15a of said shaft 15 provide a radial bearing. Said thrust bearing portion 18 of said rotor boss 5 and said thrust bearing portion 19 of said shaft act as a thrust bearing.

A rotor magnet 2 is magnetized so as to have twenty magnetic poles and coupled to said rotor yoke 1. A position detecting rotor 4 has ten teeth and ten slots, and is attached to said rotor boss 5 so as to rotate with the rotor yoke 1. A stator core 3 which is an embodiment of a stator windings positioning means, is mounted on a supporting member 16 to which the shaft 15 is fixed, and said supporting member 16 is mounted on chassis 17. On the stator core 3, there are provided 60 skewed slots 3a having wound therearound stator windings 6, 7 and 8 as shown in the figure. Position detecting arms 9a, 10a, 11a, 12a, 13a and 14a are arranged around the inner periphery of the stator core 3. Primary windings 9, 11 and 13 and secondary windings 10, 12 and 14 are arranged on each position detecting arm.

Figure 3:
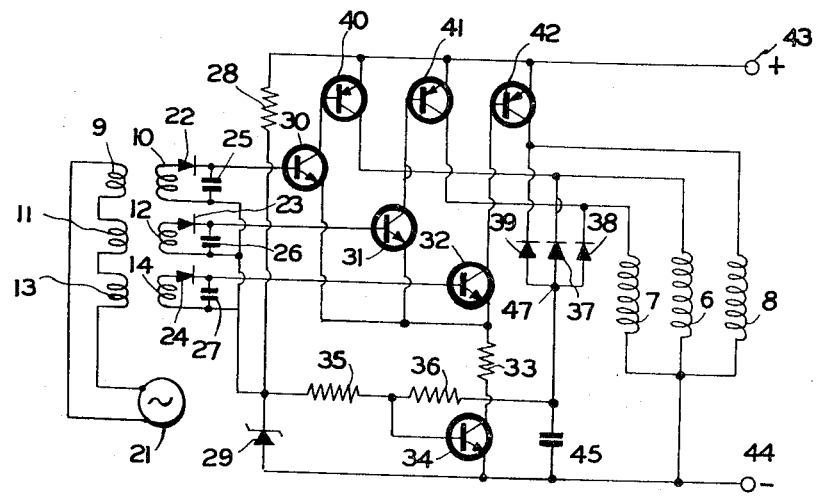
FIG. 3 is a schematic circuit diagram of an embodiment of the invention.

In FIG. 3, a driving circuit according to the invention is illustrated. Referring to the figure, an oscillator 21 is supplied power from power source terminals 43 and 44 and generates a relatively high frequency alternating current signal. The output signal of said oscillator 21 is fed to the primary windings 9, 11 and 13.

Diodes 22, 23 and 24 are connected forwardly with respect to current flow from the secondary windings between first ends of the respective secondary windings and the respective bases of transistors 30, 31 and 32. Each of the other ends of the secondary windings 10, 12 and 14 are connected to one another and connected to a point at which a resistor 28 and Zener diode 29 are connected to each other. Resistor 28 and Zener diode 29 are connected in series across the power supply lines from the terminals 43 and 44.

Capacitors 25, 26 and 27 are connected between the bases of the transistors 30, 31 and 32 and the other ends of said secondary windings, respectively.

The emitters of the transistors 30, 31 and 32 are connected to one another. A resistor 33 and the collector to emitter path of a transistor 34 is connected in series between said commonly connected emitters of transistors 30, 31 and 32 and the power supplying terminal 44.

The bases of transistors 40, 41 and 42 are connected to the collectors of the transistors 30, 31 and 32, respectively.

The emitters of the transistors 40, 41 and 42 are each connected to the other power supplying terminals 43.

The collectors of the transistors 40, 41 and 42 are connected to one end of the stator windings 6, 7 and 8, respectively and each of the other ends of the stator windings 6, 7 and 8 is connected to the power supply terminal 44.

Transistors 30, 31 and 32 have a polarity opposite to that of transistors 40, 41 and 42; ie, if transistors 40, 41 and 42 are PNP type transistors, transistors 30, 31 and 32 are NPN type transistors and vice versa.

First electrodes of diodes 37, 38 and 39 are respectively connected to the ends of the stator windings 6, 7 and 8 to which the collectors of the transistors 40, 41 and 42 are respectively connected, in a blocking direction with respect to the collector currents of the transistors 40, 41 and 42. The electrodes of the diodes 37, 38 and 39 are connected together at a point 47. A resistor 36 is connected between the base of the transistor 34 and said point 47.

A capacitor 45 is connected between the point 47 and the power supply terminal 44. A resistor 35 is connected between the base of the transistor 34 and the junction point of resistor 28 and the Zener diode 29.

Figure 4:
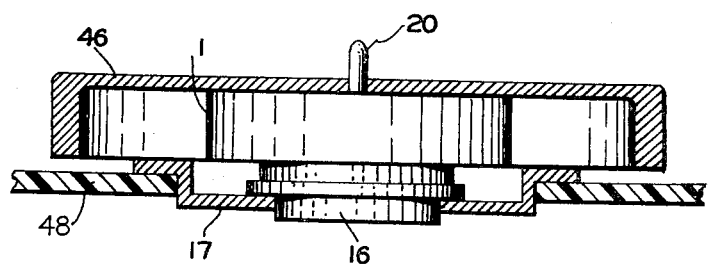
FIG. 4 is a side view of another embodiment of the in-vention.

In FIG. 1 and FIG. 2, the rotor yoke 1 is also utilized as a turntable. But in FIG. 4, a turntable 46 is mounted on the rotor yoke 1, and said support member 16 is mounted to a panel board through the chassis for the purposes of reducing the flutter and noise more successfully.

The operation of this apparatus will be described hereinafter.

The output signal of the oscillator 21 is fed to the primary windings 9, 11 and 13. Adjacent pairs of primary windings and secondary windings (in the case of FIGS. 1, 9 and 10, 11 and 12, 13 and 14 are such pairs) comprise a transformer. The teeth and slots of the position detecting rotor 4 vary the coupling between the primary windings and secondary windings.

Diodes 22, 23 and 24 rectify said output signal from the secondary windings 10, 12 and 14, and capacitors 25, 26 and 27 filter out the carrier frequency, i.e., the frequency generated by the oscillator 21. The output voltages from each of said diodes are supplied to the base of the transistors 30, 31 and 32, respectively. The emitters of the transistors 30, 31 and 32 are commonly connected to an impedance means consisting of the series connection of the resistor 33 and the transistor 34. As described above, each of the other ends of the secondary windings 10, 12 and 14 are connected to one another and connected to a junction point of the resistor 28 and the Zener diode 29, and therefore the transistors 30, 31 and 32 operate selectively, ie only the transistor of which the base voltage is highest becomes conducting.

In the case of FIG. 1, the coupling between the primary winding 9 and the secondary winding 10 is close and the coupling between 11 and 12 and 13 and 14 are loose. Therefore, the AC voltage signal induced at the secondary winding 10 is the largest of the three. The base voltage of the transistor 30 is higher than that of the transistors 31 and 32. The transistor 30 conducts and transistors 31 and 32 do not conduct. This results in the transistor 40 conducting, and current therefore flows through the stator winding 6 to generate the rotational torque in cooperation with the rotor magnet 2.

The rotor is now assumed to rotate in a clockwise direction. When the rotor 1 rotates approximately six degrees from the position shown in FIG. 1, the tooth d of the position detecting rotor 4 will face the position detecting arms 11a and 12a, and the coupling between the primary winding 11 and the secondary winding 12 becomes close and the coupling between the primary winding 9 and the secondary winding 10 becomes loose. Then, the voltage signal induced at the secondary winding 12 is the largest of the three. Accordingly, the transistors 30 and 40 do not conduct and the transistors 31 and 41 conduct, and current flows through the stator winding 7 to continue the generation of rotational torque.

After the rotor 1 rotates approximately 12° from the position shown in FIG. 1, the tooth g of the position detecting rotor 4 will face the arms 13a and 14a, and the coupling between the primary winding 13 and the secondary winding 14 becomes close.

Then, the voltage signal induced at the secondary winding 14 becomes the largest of the three and, accordingly the transistors 30 and 40, and 31 and 41 do not conduct and the transistors 32 and 42 conduct. Then, current flows through the stator winding 8 to continue generation of rotational torque. The rotor 1 continues to rotate in the manner described hereinbefore.

Back electromotive force (BEMF) is induced in stator windings 6, 7 and 8, each of which has an AC voltage having a phase difference of 120° to one another.

The energization of the stator windings occurs during the period when the polarity of the BEMF is equal to the polarity of the power source. The current does not flow through the windings when the BEMF is in a direction reverse to that of the power source.

The diodes 37, 38 and 39 rectify the BEMF voltage in the reverse direction and provide a DC voltage containing a rippled voltage at the point 47. This voltage is smoothed by the capacitor 45, and there is obtained a DC voltage which is proportional to the rotational speed of the rotor 1. The Zener diode 29 provides a reference voltage. The base voltage of the transistor 34 varies according to the ratio of the resistance values of resistors 36 and 35 and the ratio of the voltages of the BEMF voltage appearing at the point 47 and the reference voltage of Zener diode 29. The base and collector currents of the transistor 34 vary greatly when the base voltage thereof is about 0.5 – 0.7 volts. The collector current of the transistor 34 controls the collector currents of the transistors 30, 31 and 32 and consequently controls the currents flowing through the stator windings 6, 7 and 8.

The resistance values of the resistors 35 and 36 are provided such that the ratio thereof is nearly equal to the ratio of the reference voltage and the voltage of the point 47 corresponding to the predetermined speed.

Then, if the speed of the rotor 1 exceeds the predetermined speed, the base voltage of the transistor 34 decreases, causing a decrease in the base current of the transistors 40, 41 and 42. Consequently, the generated torque is decreased, and thereby the speed of the rotor 1 is decreased. When the speed of rotor 1 drops below the predetermined speed, the base current of the transistor 34 increases so as to increase the base currents of the transistors 40, 41 and 42. Then, the generated torque is increased, and thereby the speed of the rotor 1 is increased. Therefore, the speed of the rotor 1 is regulated so as to be an almost constant speed of a predetermined value.

Such a predetermined value of the rotor speed can be provided only by determining the suitable resistance value of the resistor 35 or resistor 36. Therefore, it is only necessary to vary the values of the resistances to control the speed of the phonograph turntable.

Fine adjustment of the turntable speed is easily achieved only by providing that the resistor 35 or 36 be a variable resistor.

The rotational torque between the rotor magnet 2 and stator windings generated by the current flowing through the stator windings is described hereinbefore. However, the torque produced between the rotor magnet and the stator windings varies periodically with their relative rotational position, because the value of the interlinking magnetic flux to the stator winding by the rotor magnet varies with their relative angular position. When the rotor is rotating to a constant speed, the angle between the rotor magnet and the stator winding varies at a constant rate with time, and then the torque varies periodically with time.

As the magnet has 20 poles in this case and the commutation rate is three times per one N–S pole pair, the angular period of the generated torque ripple is 1/30 revolution or 12°. When the rotor magnet has P poles and the commutation rate is Z, the dominant angular period becomes 2/PZ revolutions or 2/PZ×360°. When the rotor is rotating, the ripple frequency becomes PZ/2×N/Hz; N being the speed of the rotor in revolutions per minute (rpm). In the case of the example of FIG. 1, the ripple frequency is 110/6 Hz at the speed of 100/3 rpm. The above mentioned inherent torque ripple causes the periodical speed deviation of the turntable. But the present inventors have found that the inherent torque ripple also produce a sort of noise.

When the support member is fixed to the ground, the support member cannot move. There is no twisting vibration in the support member. When the support member is fixed to a panel board and floated by cushions from the ground, the panel board vibrates torsionally about the axis of the turntable. It has been also discovered by the inventors that the twisting of the panel board has a same effect as the background noise of the phonograph record. Though the dominant frequency of the ripple torque is 100/6 Hz, which is below the audible frequency region, the ripple torque contains many harmonic frequency components. The twisting of the panel board causes the vibration of the pick up arm usually used in combination with the turntable apparatus. The vibration of the arm causes the vibration of the stylus of the cartridge mounted on the arm, so that the cartridge produces an electric signal at the output terminal. Therefore it is very important to reduce the twisting of the panel board in such an electronically commutated direct drive turntable apparatus. It has been discovered according to the present invention that a low noise turntable of this type is achieved by increasing the moment of inertia of the panel board, not by weight or hardness.

The data of Table 1 shows the relations of the moment of inertia of the panel board and the signal to noise ratio. The signal to noise ratio is the ratio of the two voltage values, ie, the signal value and the noise value, at the output of the amplifier having the equalization characteristic (RIAA) for the phonograph record. The signal value is measured by using a standard record disc having a standard signal in a frequency of 1 KHz and a standard amplitude recorded thereon. The noise value is measured by using a lacquer record disc having no signal recorded thereon.

TABLE 1

| Moment of inertia of panel board | Signal to noise ratio in dB |
| --- | --- |
| 20 Kg cm² | 20 dB |
| 200 Kg cm² | 40 dB |
| 2000 Kg cm² | 60 dB |
| 20000 Kg cm² | 70 dB |

The Table 1 shows data on 20 poles. However, the use of a number of poles different from 20 shows the same result as that of Table 1. The reason is as follows:

When the number of poles is decreased, the angular deviation of the twisting panel increases. Harmonic components higher in the frequency than 20 Hz are of a larger number of order. The increase of the number of order of harmonics decreases the amplitude of the component. As shown in the Table 1, the signal to noise ratio increases with an increase in the moment of inertia of the panel board. The usual record disc has a signal to noise ratio of about 35 dB. It is necessary for the moment of inertia of the panel board to have a noise ratio higher than 35 dB. The moment of inertia of the panel board higher than 200 Kg cm² achieves a turntable having a signal to noise ratio higher than 40 dB in accordance with the present invention.

As mentioned previously, the ripple torque produces a flutter, ie a periodical speed deviation of the turntable. Since both the twisting of the panel board and the flutter of the turntable are originated from the ripple torque, the reduction of the ripple torque is very effective for obtaining a high performance turntable. An increase of the commutation rate per pole pair is suitable for this purpose, but it requires many semiconductor devices for the commutation circuit. Although an increase of the number of poles of the rotor magnet does not reduce the amplitude of the ripple torque, it reduces flutter similarly to an increase of the commutation rate, because the ripple frequency increases in proportion to the pole number and the flutter of the turntable decreases in inverse proportion to the frequency.

It has been discovered according to the present invention that the flutter can be satisfactorily reduced by employing more than ten poles.

The flutter of the turntable is reduced also by increasing the moment of inertia of the turntable. The larger the moment of inertia of the turntable, the smaller the flutter.

But the increase of the moment of inertia of the turntable is practically limited because a higher moment of inertial of the turntable prolongs an acceleration time to bring the turntable into a predetermined rotational speed. It has been also discovered according to the present invention that the flutter can be more satisfactorily reduced by employing more than ten poles with the turntable having a moment of inertia larger than 100 Kg cm². The data of Table 2 shows the relationships among the flutter, the number of poles, and the moment of inertia of the turntable. The measurement of the flutter is carried out employing a standard record disc having a 3 KHz signal recorded thereon.

TABLE 2

Flutter (%)

| Number of poles | Moment of inertia of turntable | | |
|---|---|---|---|
| | 100 Kg cm² | 300 Kg cm² | 1000 Kg cm² |
| 6 | x | x | 2.0% |
| 8 | 2.5% | 1.0% | 0.3% |
| 10 | 0.5% | 0.15% | 0.05% |
| 20 | 0.1% | 0.03% | 0.01% |
| 40 | 0.03% | 0.01% | 0.01% |
| 60 | 0.01% | 0.01% | 0.1% |

But the increase of the number of poles raises a new problem that the induced voltage which appears at the magnetic type pickup cartridge due to the leakage flux of the rotating permanent magnet rotor also is apt to deteriorate the reproduced sound. The amplitude of the induced voltage is in proportion to the frequency. Therefore the increase of the number of poles increases the amplitude of the induced voltage. Moreover, when the frequency of the leakage flux is in the audio frequency region, the leakage flux generates noise.

It has been discovered according to the present invention that the noise can be satisfactorily reduced by employing a number of poles less than one hundred. The relationship between the number of poles and the frequency of induced voltage is shown in the Table 3.

TABLE 3

| number of poles | Frequency Hz Speed | |
|---|---|---|
| | 33 1/3 rpm | 45 rpm |
| 10 | 2.77 Hz | 3.75 |
| 20 | 5.5 | 7.5 |
| 40 | 11.1 | 15.0 |
| 60 | 16.6 | 22.5 |
| 80 | 22.2 | 30.0 |
| 100 | 27.72 | 37.5 |
| 120 | 33.33 | 45.0 |

The noise and flutter are further improved by employing a panel board having a moment of inertia larger than 200 Kg cm² in association with a use of poles of a number of from 10 to 100.

It has been discovered according to the present invention that the noise and flutter can be more satisfactorily reduced by employing a turntable having a moment of inertia larger than 100 Kg cm², a panel board having a moment of inertia larger than 200 Kg cm², and poles in a number of from 10 to 100. Some examples are shown in Table 4.

TABLE 4

| Case | conditions No. of poles | Moment of inertia of turntable (Kg cm²) | Moment of inertia of panel board (Kg cm²) | Signal to noise ratio (dB) | Flutter (% rms) |
|---|---|---|---|---|---|
| 1 | 20 | 100 | 200 | 40 | 0.1 |
| 2 | 20 | 300 | 1000 | 50 | 0.03 |
| 3 | 60 | 100 | 200 | 40 | 0.01 |
| 4 | 60 | 300 | 1000 | 50 | 0.01 |

However, there exists another torque or force generated by the magnetic action.

A magnetic material receives a force in a magnetic field, the direction and magnitude of which corresponds to the deviation of the energy stored in the magnetic field. Since the rotor has magnetic poles and the stator has slots, the magnetic field generated in the air gap between the stator and the rotor varies according to the rotational position of the rotor and the stator. The variation of the magnetic field causes the deviation in the energy stored in the magnetic field, which generates a torque between the stator and the rotor.

In the arrangement of FIG. 1, the number of the slots of the stator core 3 is three for one pole pitch of the rotor magnet 2, and accordingly there are sixty slots in all around the stator core 3. When the relation of the position between the rotor magnet 2 and stator core 3 changes, the magnetic relation between the poles of the magnetic rotor 2 and the slots is changed. The period of the magnetic reluctance variation for the magnet is equal to the pitch of the slots. Therefore, the reluctance varies 60 cycles per revolution.

According to the reluctance variation, the magnetic energy varies between maximum and minimum values, and a magnetic force necessary to keep the magnetic energy at a minimum is generated. The rotational torque between the rotor magnet 2 and stator core 3 varies 60 times per revolution. When rotor 1 is rotating in clockwise direction, the sequential change of the torque is as follows;

zero (at stable balancing point) ⟶ counter clockwise torque ⟶ zero (at unstable balancing point) ⟶ clockwise torque ⟶ zero (at stable balancing point).

These phenomena occur independently when the rotor magnet is rotated by the rotational torque generated by the currents flowing through the stator windings, and two kinds of torque are superposed on each other.

However, this problem can be resolved by providing the slots of the stator core skewed. Skewing the slots makes the reluctance variation small, and also reduces the torque ripple to small value, and therefore provides a directly driven turntable apparatus having an excellent S/N characteristic and having little rumble.

The inventors have discovered that the vibration becomes minimal when the degree of skew is equal to about one pitch of the slots. According to such a skewing, the level of the vibration can be decreased to be much smaller than that of the noise which occurs in a conventional phonograph record.

As mentioned above, a turntable apparatus according to the present invention has many excellent advantages such as:

(I) A turntable apparatus of the invention is of the direct drive type and has no torque transmission mechanism. Therefore, there is no "wow" and "flutter" which is usually caused from such a mechanism. Further, the motor rotates at a very low speed such as 33 ⅓ rpm or 45 rpm and there are no high speed revolutional parts in the turntable apparatus, therefore harmful vibration is not produced and accordingly rumble is almost zero. Furthermore, the rotor of the motor is used directly as turntable, so the speed control of the turntable is achieved directly by the speed control of the motor and therefore the turntable speed is quite stable. Moreover, since the problems resulting from the deterioration of the transmission mechanism are not present in the invention, the initial characteristics can be maintained for a long time.

(II) The turntable apparatus is operated by DC power source, and accordingly, the speed of the turntable does not depend on the line frequency. Moreover, since the DC motor does not induce hum to a pick up cartridge, a superior S/N results. In the case of the DC motor, a large starting torque is available for its volume, and the turntable can be raised quickly to the predetermined speed. Although a large power is necessary at starting, after the turntable has reached the predetermined speed, only a small power is necessary to maintain rotation. Therefore, a low power dissipation results in the decrease of unfavorable mechanical vibrations.

(III) The turntable apparatus employs a motor of the electronically commutated brushless type which is self-starting and which has detecting means which detect rotational position, thereby assuring sufficient starting torque. Moreover, electronic commutator does not cause sliding noise usually generated by brushes and commutators, and further causes no harmful vibration.

(IV) The constant speed control of the turntable can be electronically carried out easily, and the stability of the speed is excellent. Because of electronic controls, no speed changing mechanism is required and fine adjustment of the speed can be carried out easily.

(V) By skewing the stator core, the generation of the harmful vibration can be decreased.

(VI) As the energy necessary to maintain a predetermined speed is very small, and the efficiency of conversion of electrical energy to mechanical energy is high in this motor, the increase of the temperature in the parts such as stator windings, etc. is extremely small.

What is claimed is:

1. A directly driven turntable apparatus for phonograph records comprising a rotor axis means having a radial bearing portion, a thrust bearing portion, and a spindle portion for said phono-graph record;

a turntable;

a support member;

a stator axis means, comprising a radial bearing portion and a thrust bearing portion, being positioned in said support member, and constructing radial and thrust bearings in association with said rotor axis means;

a permanent magnet;

a rotor yoke secured to said rotor axis means and having a magnet holding portion for said magnet;

a position detecting means comprising a position detecting rotor means and a position detecting stator means that are positioned inside said magnet, said position detecting rotor means being coupled to said rotor axis means and rotatable with said rotor;

stator windings;

a stator windings positioning means secured to said support member and supporting said stator windings in regular positions, said position detecting means secured to said stator windings positioning means;

speed regulating means comprising means for detecting the rotational speed of said rotor and producing an electric signal corresponding to the rotational speed of said rotor, means for producing an electric reference signal corresponding to the predetermined speed, and means for controlling the current to said stator windings for controlling the speed of said turntable; and a panel board having a moment of inertia larger than 200 Kg cm$^2$ and having said support member secured thereto.

2. A directly driven turntable apparatus for phonograph records comprising a rotor axis means having a radial bearing portion, a thrust bearing portion, and a spindle portion for said phonograph record;

a turntable;

a support member;

a stator axis means, comprising a radial bearing portion and a thrust bearing portion, being positioned in said support member, and constructing radial and thrust bearings in association with said rotor axis means;

a permanent magnet having poles in the number of from ten to one hundred;

a rotor yoke secured to said rotor axis means and having a magnet holding portion for said magnet;

a position detecting means comprising a position detecting rotor means and a position detecting stator means that are positioned inside said magnet, said position detecting rotor means being coupled to said rotor axis means and rotatable with said rotor;

stator windings;

a stator windings positioning means secured to said support member and supporting said stator windings in regular positions, said position detecting means secured to said stator windings positioning means, a power source including switching means for energizing said stator windings in accordance with position signals provided by said position detecting stator means, and a speed regulating means comprising means for detecting the rotational speed of said rotor and producing an electric signal corresponding to the rotational speed of said rotor, means for producing an electric reference signal corresponding to the predetermined speed, and means for controlling the current to said stator windings for controlling the speed of said turntable.

3. A directly driven turntable apparatus for phonograph records comprising
- a rotor axis means having a radial bearing portion, a thrust bearing portion, and a spindle portion for said phonograph record;
- a turntable;
- a support member;
- a stator axis means, comprising a radial bearing portion and a thrust bearing portion, being positioned in said support member, and constructing radial and thrust bearings in association with said rotor axis means;
- a permanent magnet having poles in the number of from ten to one hundred;
- a rotor yoke secured to said rotor axis means and having a magnet holding portion for said magnet;
- a position detecting means comprising a position detecting rotor means and a position detecting stator means that are positioned inside said magnet, said position detecting rotor means being coupled to said rotor axis means and rotatable with said rotor;
- stator windings;
- a stator windings positioning means secured to said support member and supporting said stator windings in regular positions, said position detecting means secured to said stator windings positioning means;
- a power source including switching means for energizing said stator windings in accordance with position signals provided by said position detecting stator means;
- a speed regulating means comprising means for detecting the rotational speed of said rotor and producing an electric signal corresponding to the rotational speed of said rotor, means for producing an electric reference signal corresponding to the predetermined speed, and means for controlling the current to said stator windings for controlling the speed of said turntable; and
- a panel board having a moment of inertia larger than 200 Kg cm², said support member being secured on said panel board.

4. A directly driven turntable apparatus for phonograph records as claimed in claim 3, wherein said turntable has a moment of inertia larger than 100 Kg cm².

5. A directly driven turntable apparatus for phonograph records comprising
- a rotor axis means having a radial bearing portion, a thrust bearing portion, and a spindle portion for said phonograph record;
- a turntable;
- a support member;
- a stator axis means, comprising a radial bearing portion and a thrust bearing portion, being positioned in said support member, and constructing radial and thrust bearings in association with said rotor axis means;
- a permanent magnet;
- a rotor yoke secured to said rotor axis means and having a magnet holding portion for said magnet;
- stator windings;
- a stator windings positioning means secured to said support member, having said stator windings arranged to the outside thereof;
- a position detecting rotor means having multiple teeth and being arranged to rotate together with said rotor;
- a position detecting stator means comprising a oscillator, primary windings connected to said oscillator, and secondary windings mounted adjacent to said primary windings, said position detecting stator means being arranged at the inside of said stator windings positioning means, said position detecting rotor means being arranged to rotate within said position detecting stator means;
- a power source including switching means for energizing said stator windings in accordance with position signals provided by said position detecting stator means; and
- a speed regulating means comprising means for detecting the rotational speed of said rotor and producing an electric signal corresponding to the rotational speed of said rotor, means for producing an electric reference signal corresponding to the predetermined speed, and means for controlling the current to said stator windings for controlling the speed of said turntable.

* * * * *